(12) United States Patent
Park (10) Patent No.: US 6,937,588 B2
(45) Date of Patent: Aug. 30, 2005

(54) SYSTEM AND METHOD FOR PROVIDING WIRELESS APPLICATION PROTOCOL SERVICE THROUGH INTERNET

(75) Inventor: Woo-kyeong Park, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 835 days.

(21) Appl. No.: 09/801,060

(22) Filed: Mar. 8, 2001

(65) Prior Publication Data

US 2002/0001295 A1 Jan. 3, 2002

(30) Foreign Application Priority Data

Jun. 26, 2000 (KR) ........................................ 2000-35332

(51) Int. Cl.$^7$ ................................................ H04Q 7/24
(52) U.S. Cl. ........................ 370/338; 370/349; 709/219
(58) Field of Search ................................ 455/217, 218, 455/219, 422.1; 370/328, 338, 342, 345, 349, 401, 465, 466, 469, 347; 709/203, 230, 231

(56) References Cited

U.S. PATENT DOCUMENTS

| | | | | |
|---|---|---|---|---|
| 6,246,688 B1 | * | 6/2001 | Angwin et al. | 370/401 |
| 6,490,291 B1 | * | 12/2002 | Lee et al. | 370/401 |
| 6,523,062 B1 | * | 2/2003 | Bridgman et al. | 709/203 |
| 6,549,773 B1 | * | 4/2003 | Linden et al. | 455/426.1 |
| 6,589,291 B1 | * | 7/2003 | Boag et al. | 715/513 |
| 6,658,011 B1 | * | 12/2003 | Sevanto et al. | 370/401 |
| 6,678,518 B2 | * | 1/2004 | Eerola | 455/422 |
| 6,681,380 B1 | * | 1/2004 | Britton et al. | 717/115 |
| 6,694,431 B1 | * | 2/2004 | Binding et al. | 713/160 |
| 6,708,217 B1 | * | 3/2004 | Colson et al. | 709/231 |
| 6,751,731 B1 | * | 6/2004 | Binding et al. | 713/171 |

FOREIGN PATENT DOCUMENTS

| | | |
|---|---|---|
| EP | 1 083 722 A2 | 3/2001 |
| EP | 1 111 870 A2 | 6/2001 |
| JP | 2000-115284 A | 4/2000 |
| JP | 2001-127803 A | 5/2001 |
| JP | 2001-186126 A | 7/2001 |

OTHER PUBLICATIONS

Wolfgang Schulte, "Das Internet Fuer Unter Wegs" dated Nov. 10, 1998.
Schulte W: "Das Internet Fuer Unter Wegs" Elektronik, Franzis Verlag GMBH. Munchen, DE, vol. 47, No. 23, Nov. 10, 1998, pp. 106, 108, 110–113, XP000875170.
"Wireless Application Protocol. Wireless Application Environment Overview Version 1.3", Wap Standard, Mar. 29, 2000, XP002164666.
Stallings W: "Cryptography and Network Security, Principles and Practice, 2$^{nd}$ Edition", Cryptography and Network Security: Principles and Practice, XX, XX, 1999, pp. 399–440, XP002167283.

* cited by examiner

Primary Examiner—Bob A. Phunkulh
(74) Attorney, Agent, or Firm—Sughrue Mion, PLLC (57) ABSTRACT

A method is provided for providing wireless application protocol (WAP) service in which a content server on the Internet performs data processing at a wireless datagram protocol (WDP) layer and higher layers. The content server receives a WAP request message for wireless Internet service from a WAP terminal connected to a mobile communications network; processes the request; and constructs and transmits to the WAP terminal a response based on the WAP. A relay providing a communications channel between the mobile communications network and the Internet relays the request message and the response at a layer below the WDP layer. Accordingly, a mobile business company providing a communications channel between the mobile communications network and the Internet performs only a relay function at the layer below a WDP layer, and an actual content provider or WAP server performs data processing at the WDP layer and higher layers.

19 Claims, 10 Drawing Sheets

SYSTEM AND METHOD FOR PROVIDING WIRELESS APPLICATION PROTOCOL SERVICE THROUGH INTERNET

BACKGROUND OF THE INVENTION

1. Field of the Invention

The present invention relates to a wireless application protocol (WAP) service, and more particularly, to a method for directly providing a WAP service (including the case of providing a WAP service together with a web service) for wireless Internet in an actual content provider (or a WAP server) on the Internet, instead of using the relay server of a mobile business company providing a communications channel between a mobile communications network and the Internet, and a method allowing a content provider to intermediate between a wireless Internet terminal and another content provider on the Internet for realizing a portal service.

2. Description of the Related Art

The convenience of mobile communications terminals has rapidly expanded the market for mobile communications terminals throughout the world. The market for mobile communications terminals started with analog cellular phones and has expanded to digital cellular phones and further to personal communications service (PCS) phones. In addition, the market for terminals related to IMT2000 for the next generation mobile communications is gradually being formed. The development of mobile communications technology has allowed a mobile communications terminal to access a data network such as the Internet, and thus a variety of wireless application services (hereinafter, referred to as a wireless Internet service), such as Internet content service through a mobile communications network have been developed.

However, mobile communications terminals have limits in available resources such as power supply, the size and visibility of a display, transmission rate, and processor and memory capacities in view of mechanical characteristics. Accordingly, communications protocols and/or content expression formats (document forms) for the wireless Internet, which allow users to use various wireless Internet services through mobile communication terminals, are designed to be simple in consideration of the limited resources of mobile communications terminals, as compared to protocols and/or document formats allowing users to access the Internet through computers and use web services.

Figure 1:
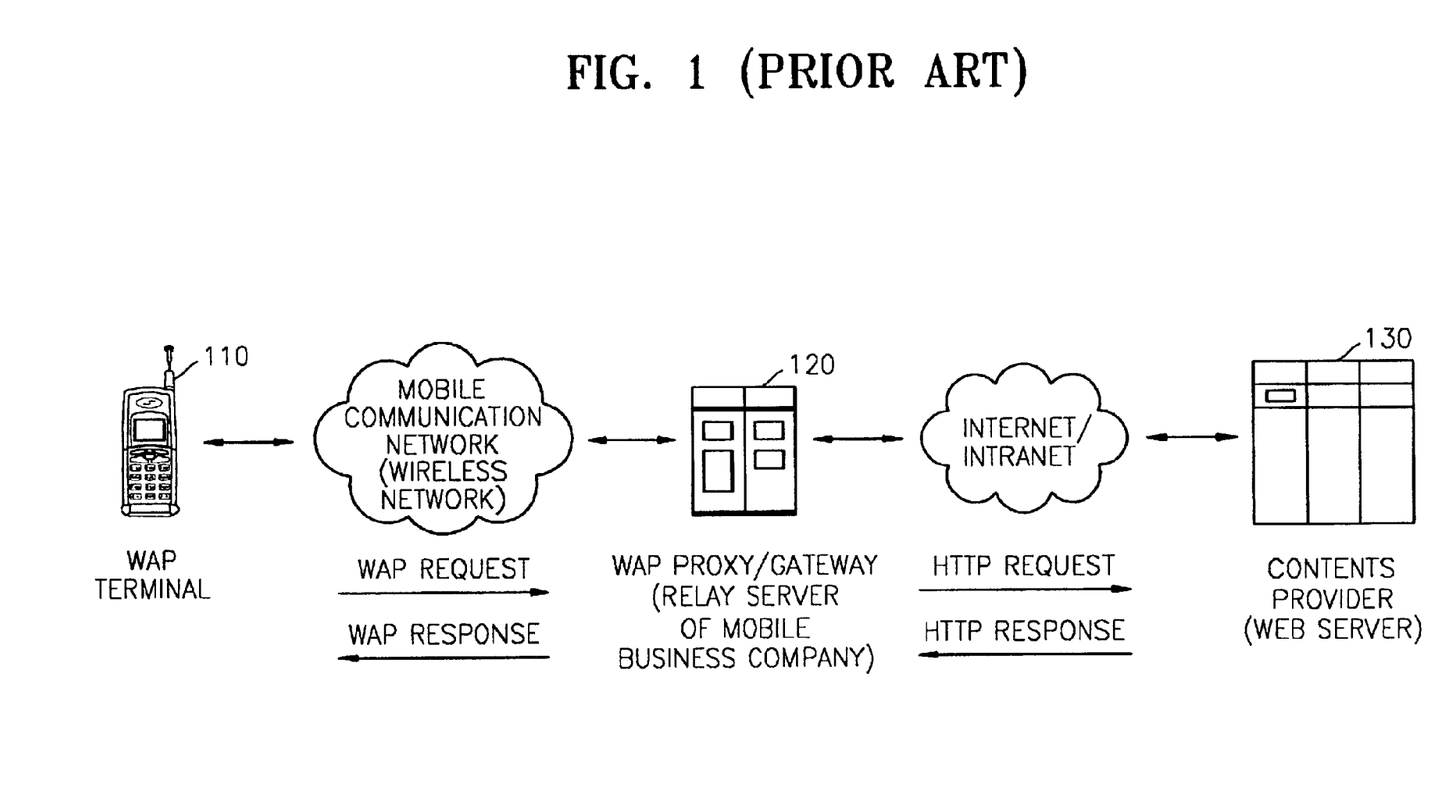
FIG. 1 a schematic diagram illustrating the configuration of a conventional system for a wireless Internet service and the operation thereof.

Among the communications protocols that have been standardized or are being standardized for the wireless Internet, a representative one is the wireless access protocol (WAP) suggested by the WAP forum. The representative document format for the wireless Internet is the wireless markup language (WML) corresponding to a hypertext markup language (HTML) used for a web service on the Internet. FIG. 1 schematically illustrates the configuration of a conventional system for a wireless Internet service and the operation thereof.

As shown in FIG. 1, a conventional WAP service model is composed of a WAP terminal 110 which is a mobile communications terminal supporting the WAP, a WAP proxy/gateway 120 (usually managed by a mobile communications business company) which acts as a relay server for providing a communications channel between a mobile communications network and the Internet, and a content provider 130 which is a web server on the Internet.

Once a user of the WAP terminal 110 requests a wireless Internet service or enters the universal resource locator (URL) of the server 130 by operating, for example, a keypad on the WAP terminal 110, the WAP terminal 110 interprets user input and transmits a wireless Internet service request to the WAP gateway 120 based on a WAP mode.

The WAP gateway 120 has, in addition to the simple relay function, a function of converting the WAP service request received from the WAP terminal 110 into a web service request (HTTP request) for web service on the Internet. The WAP gateway 120 transmits the HTTP request to the server 130 on the Internet. During the conversion, a security mechanism applied to a WAP service request message is released, and a security mechanism for a HTTP request message is newly applied.

Next, the web server 130 on the Internet interprets the HTTP request, performs appropriate processes, and transmits the result as a HTTP response to the WAP gateway 120. For example, when a particular web page is requested, the particular web page is transmitted as a response. When a common gateway interface (CGI) or a script application program is selected, the result of executing the corresponding application program is transmitted as a response.

The WAP gateway 120 converts the HTTP response received from the web server 130 into a WAP response and transmits the WAP response to the WAP terminal 110. During this procedure, a security mechanism is released and reset.

Finally, the WAP terminal 110 receives the WAP response, interprets a WML deck, and shows a first card to the user. Here, the term "deck" indicates a data transmission unit in the wireless Internet, and the term "card" indicates a screen display unit which is displayed on the screen of the WAP terminal 110 at one time.

As described above, the conventional wireless Internet service model is very weak in terms of security. In other words, the security between the WAP gateway 120 and the WAP terminal 110 is usually set using a wireless transport layer security (WTLS), and the security between the WAP gateway 120 and the web server 130 on the Internet is usually set using an HTTP security (HTTPS) or a secure socket layer (SSL), so data can be revealed at the WAP gateway 120 managed by a mobile business company. Accordingly, the conventional wireless Internet service model does not guarantee end-to-end security. Moreover, since data processing at every WAP layer is performed in the WAP gateway 120, a bottleneck may occur.

The user of a particular WAP terminal 110 can be provided only with the services provided by the mobile business company managing the particular WAP terminal 110. Accordingly, communications with another WAP terminal user using a different mobile business company is not available. This restricts the openness of the Internet.

In addition, a content provider providing a web service on the Internet is required to separately construct, maintain and repair the same content for each mobile business company. Accordingly, unnecessary expenses are incurred.

SUMMARY OF THE INVENTION

To solve the above problems, it is an object of the present invention to provide a system and method for directly providing a wireless application protocol (WAP) service (including the case of providing the WAP service together with a web service) direct wireless Internet, in which a mobile business company (a relay server) providing a communications channel between a mobile communications network and the Internet performs only a relay function at a layer below a wireless datagram protocol (WDP) layer in the WAP, and an actual content provider (a server) on the Internet performs data processing at the WDP layer or higher layers.

It is another object of the present invention to provide a system and method for allowing a content provider to intermediate between a wireless Internet terminal and another content provider on the Internet to provide a portal site function for the wireless Internet.

Accordingly, to achieve one object of the invention, in one aspect, there is provided a method for providing a wireless application protocol service for wireless Internet, in which a content server on the Internet performs data processing at a wireless datagram protocol layer and higher layers. The method includes the steps of (a) the content server receiving a user's request message for a wireless Internet service from a wireless application protocol terminal connected to a mobile communications network, the request message being based on a wireless application protocol; (b) processing the request message received in the step (a) based on the wireless application protocol; and (c) constructing a response message based on the wireless application protocol to reply to the user's request for wireless Internet service and transmitting the response message to the wireless application protocol terminal, wherein a relay providing a communications channel between the mobile communications network and the Internet relays the request message transmitted in the step (a) and the response message transmitted in the step (c) at a layer below the wireless datagram protocol layer such that the request message is transferred to the content server, and the response message is transferred to the wireless application protocol terminal.

The relay intermediates between the content server and the wireless application protocol terminal, at an Internet protocol layer.

The wireless application protocol terminal is a mobile communications terminal complying with a code division multiple access (CDMA) mode, a global system for mobile communication (GSM) mode or an IMT2000 mode.

The content server provides a push service of transmitting information to the user in one-way based on the wireless application protocol.

In another aspect, there is provided a method for providing a wireless application protocol service for wireless Internet, in which a relay providing a communications channel between a mobile communications network and the Internet only performs data processing at a layer below a wireless datagram protocol layer during communications between a wireless application protocol terminal connected to the mobile communications network and a content server on the Internet, and the content server on Internet performs data processing at the wireless datagram protocol layer and higher layers. The method includes the steps of (a) the wireless application protocol terminal composing and transmitting a request message for a wireless Internet service based on a wireless communications protocol, when a request for the wireless Internet service is input by a user; (b) the relay relaying the request message transmitted in the step (a) at the layer below the wireless datagram protocol layer so that the request message is transferred to the content server; (c) the content server receiving the request message transferred in the step (b) and processing the request message based on the wireless application protocol; (d) the content server constructing a response message based on the wireless application protocol to reply to the user's request for the wireless Internet service and transmitting the response message; (e) the relay relaying the response message transmitted in the step (d) at the layer below the wireless datagram protocol layer so that the response message is transferred to the wireless application protocol terminal; and (f) the wireless application protocol terminal outputting the contents of the response message transferred in the step (e).

In yet another aspect, there is provided a method for providing a wireless application protocol service for wireless Internet, in which a content server providing a web service on the Internet performs data processing at a wireless datagram protocol layer and higher layers. The method includes the steps of (a) the content server receiving a user's request message for a wireless Internet service from a wireless application protocol terminal connected to a mobile communications network, the request message being based on a wireless application protocol; (b) the content server converting a document format for the web service through the Internet into a document format for the wireless Internet service in order to provide a response to the user's request for the wireless Internet service; and (c) constructing a response message based on the wireless application protocol using the response converted into the document format for the wireless Internet service in the step (b) and transmitting it to the wireless application protocol terminal, wherein a relay providing a communications channel between the mobile communications network and the Internet relays the request message transmitted in the step (a) and the response message transmitted in the step (c) at a layer below the wireless datagram protocol layer such that the request message is transferred to the content server, and the response message is transferred to the wireless application protocol terminal.

The wireless application protocol service provided by the content server together with the web service through the Internet is supported by a software module installed separately from a software module for the web service.

In still another aspect, there is provided a method for providing a wireless application protocol service for wireless Internet, in which a relay providing a communications channel between a mobile communications network and the Internet only performs data processing at a layer below a wireless datagram protocol layer during communications between a wireless application protocol terminal connected to the mobile communications network and a content server providing a web service through the Internet, and the content server on Internet performs data processing at the wireless datagram protocol layer and higher layers. The method includes the steps of (a) the wireless application protocol terminal constructing and transmitting a request message for a wireless Internet service based on a wireless communications protocol, when a request for the wireless Internet service is input by a user; (b) the relay relaying the request message transmitted in the step (a) at the layer below the wireless datagram protocol layer so that the request message is transferred to the content server; (c) the content server receiving the request message transferred in the step (b); (d) the content server converting a document format for the web service through the Internet into a document format for the wireless Internet service in order to provide a response to the user's request for the wireless Internet service; (e) constructing a response message based on the wireless application protocol using the response converted into the document format for the wireless Internet service in the step (d) and transmitting the constructed response message; (f) the relay relaying the response message transmitted in the step (e) at the layer below the wireless datagram protocol layer so that the response message is transferred to the wireless application protocol terminal; and (g) the wireless application protocol terminal outputting the contents of the response message transmitted in the step (f).

To achieve another object of the invention, in one aspect, there is provided a method for providing a wireless application protocol service for wireless Internet, in which a wireless application protocol server on the Internet performs data processing at a wireless datagram protocol layer and higher layers. The method includes the steps of (a) the wireless application protocol server receiving a user's request message for a wireless Internet service from a wireless application protocol terminal connected to a mobile communications network, the request message being based on a wireless application protocol; (b) converting the request message received in the step (a) into a web service request message used over the Internet; (c) transmitting the web service request message to a web server on the Internet and receiving a web service response message corresponding to the request message; (d) converting the web service response message received in the step (c) into a response message based on the wireless application protocol; and (e) transmitting the response message based on the wireless application protocol to the wireless application protocol terminal, wherein a relay providing a communication channel between the mobile communication network and the Internet relays the request message transmitted in the step (a) and the response message transmitted in the step (e) at a layer below the wireless datagram protocol layer such that the request message is transferred to the wireless application protocol server, and the response message is transferred to the wireless application protocol terminal.

In the steps (b) and (d), the protocol conversion between a communications protocol for the wireless Internet service and a communications protocol for a web service through the Internet may be performed.

In the step (d), the protocol conversion between a communications protocol for the wireless Internet service and a communications protocol for a web service through the Internet may be performed, and the document format conversion between a document format for the wireless Internet service and a document format for a web service through the Internet may be performed.

In another aspect, there is provided a method for providing a wireless application protocol service for wireless Internet, in which a relay providing a communications channel between a mobile communications network and the Internet only performs data processing at a layer below a wireless datagram protocol layer during communications between a wireless application protocol terminal connected to the mobile communications network and a wireless application protocol server on the Internet, and the wireless application protocol server on the Internet performs data processing at the wireless datagram protocol layer and higher layers. The method includes the steps of (a) the wireless application protocol terminal constructing and transmitting a request message for a wireless Internet service based on a wireless communications protocol, when a request for the wireless Internet service is input by a user; (b) the relay relaying the request message transmitted in the step (a) at the layer below the wireless datagram protocol layer so that the request message is transferred to the wireless application protocol server; (c) the wireless application protocol server receiving and converting the request message transferred in the step (b) into a web service request message used over the Internet; (d) transmitting the web service request message to a web server on the Internet and receiving a web service response message corresponding to the request message; (e) the wireless application protocol server converting the web service response message received in the step (d) into a response message based on the wireless application protocol and transmitting it to the wireless application protocol terminal; (f) the relay relaying the response message transmitted in the step (e) at the layer below the wireless datagram protocol layer so that the response message is transferred to the wireless application protocol terminal; and (g) the wireless application protocol terminal outputting the contents of the response message transmitted in the step (f).

To achieve yet another object of the invention, in one aspect, there is provided a system for providing a wireless application protocol service. The system includes a service terminal for supporting a wireless application protocol, the service terminal connected to a mobile communications network; a relay for providing a communications channel between the mobile communications network and the Internet; and a content server for providing a content service for wireless Internet, the content server connected to the Internet, wherein the relay intermediates between the service terminal and the content server at a layer below a wireless datagram protocol layer, and the content server performs data processing at the wireless datagram protocol layer and higher layers, thereby providing the wireless application protocol service for the service terminal.

In another aspect, there is provided a system for providing a wireless application protocol service. The system includes a service terminal for supporting a wireless application protocol, the service terminal being connected to a mobile communications network; a relay for providing a communications channel between the mobile communications network and the Internet; and a content server for providing content through a web service over the Internet and providing a content service for wireless Internet, the content server being connected to the Internet, wherein the relay intermediates between the service terminal and the content server at a layer below a wireless datagram protocol layer, the content server performs data processing at the wireless datagram protocol layer and higher layers, and the content server has a function of converting a document format for the web service into a document format for a wireless Internet service in order to provide the wireless application protocol service for the wireless Internet to the service terminal.

To achieve yet another object of the invention, there is provided a system for providing a wireless application protocol service. The system includes a service terminal for supporting a wireless application protocol, the service terminal connected to a mobile communications network; a relay for providing a communications channel between the mobile communications network and the Internet; a content server for providing content through a web service over the Internet, the content server being connected to the Internet; and a wireless application protocol server for intermediating between the service terminal and the content server, the wireless application protocol server being connected to the Internet, wherein the relay intermediates between the service terminal and the wireless application protocol server at a layer below a wireless datagram protocol layer, the wireless application protocol server performs data processing at the wireless datagram protocol layer and higher layers, the wireless application protocol server converts a service request into a web service request used over the Internet and transmits the service request to the content server when receiving the service request based on a wireless application protocol from the service terminal via the relay, and the wireless application protocol server converts a web service response into a response based on the wireless application protocol and transmits the converted response to the service terminal via the relay when receiving the web service response from the content server.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PRESENT INVENTION

Hereinafter, the configurations and operations of embodiments of the present invention will be described in detail with reference to the attached drawings.

The present invention overcomes the problem of a conventional wireless application protocol (WAP) service model, which is caused by a mobile business company having a WAP service solution, and provides a new WAP service model complying with the universal nature and openness of the Internet. According to the present invention, an existing mobile communications business company (a relay server) performs a simple relay function, and protocol processing and content services related to a substantial WAP service are performed directly by a content provider on the Internet.

First Preferred Embodiment

Figure 2A:
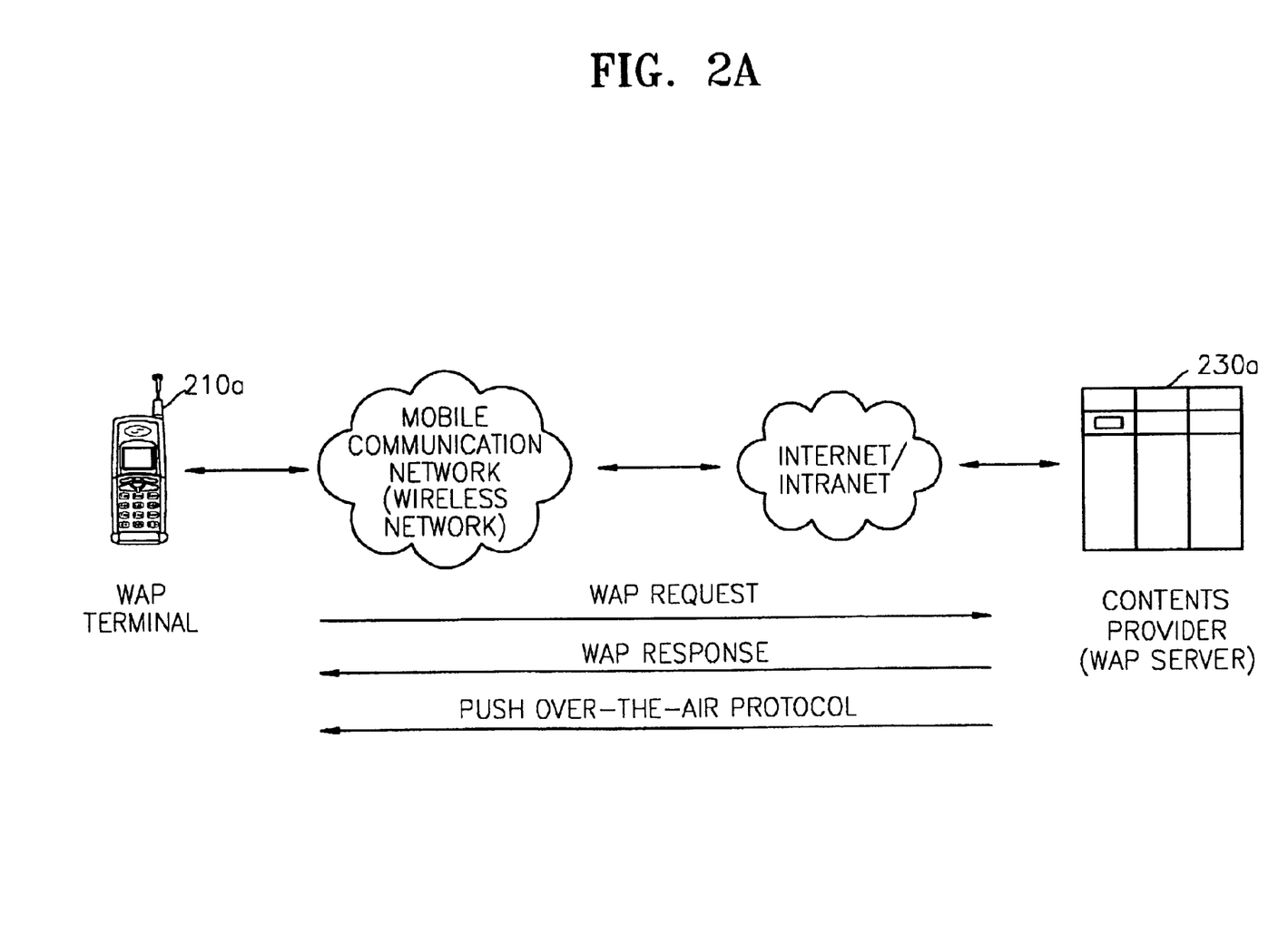
FIGS. 2A through 2C are schematic diagrams illustrating examples of configurations of systems for a wireless Internet service according to embodiments of the present invention and operations thereof.

First, the configuration of a system according to the present invention will be described. FIG. 2A is a schematic diagram illustrating an example of the configuration of a system for a wireless Internet service according to an embodiment of the present invention and the operation thereof.

As shown in FIG. 2A, a WAP service model according this embodiment of the present invention has a simple configuration including a WAP terminal 210a which is a mobile communications terminal and a content server 230a for providing a content service for the wireless Internet. The WAP terminal 210a is connected to a mobile communications network, and the content server 230a is connected to the Internet. An existing mobile business company provides just a communications channel between the mobile communications network and the Internet, acting as a mere relay, and thus is not shown in FIG. 2A. Here, the WAP terminal 210a is a mobile communications terminal complying, for example, with the code division multiple access (CDMA) mode, the global system for mobile communication (GSM) mode or the IMT2000 mode.

According to the present invention, the relay performs only a simple relay function of intermediating communications between the WAP terminal 210a and the content server 230a at a layer below a wireless datagram protocol (WDP) layer, and the content server 230a performs data processing at the WDP layer and higher layers so as to provide the WAP service for wireless Internet. Accordingly, conceptually, the WAP terminal 210a directly transmits a WAP service request for wireless Internet service to the content server 230a, and the content server 230a directly transmits a WAP response corresponding to the request to the WAP terminal 210a.

A conventional push service mechanism for transmitting information to users one-way is changed. Conventionally, a push gateway is provided. Thus, a "push over-the-air" protocol is used between the WAP terminal 210 and the push gateway, and a push access protocol (PAP) is used between the push gateway and a push server (an initiator). However, the present invention eliminates the need for the push gateway and uses a sole push over-the-air protocol between the WAP terminal 210a and the push server.

Figure 3:
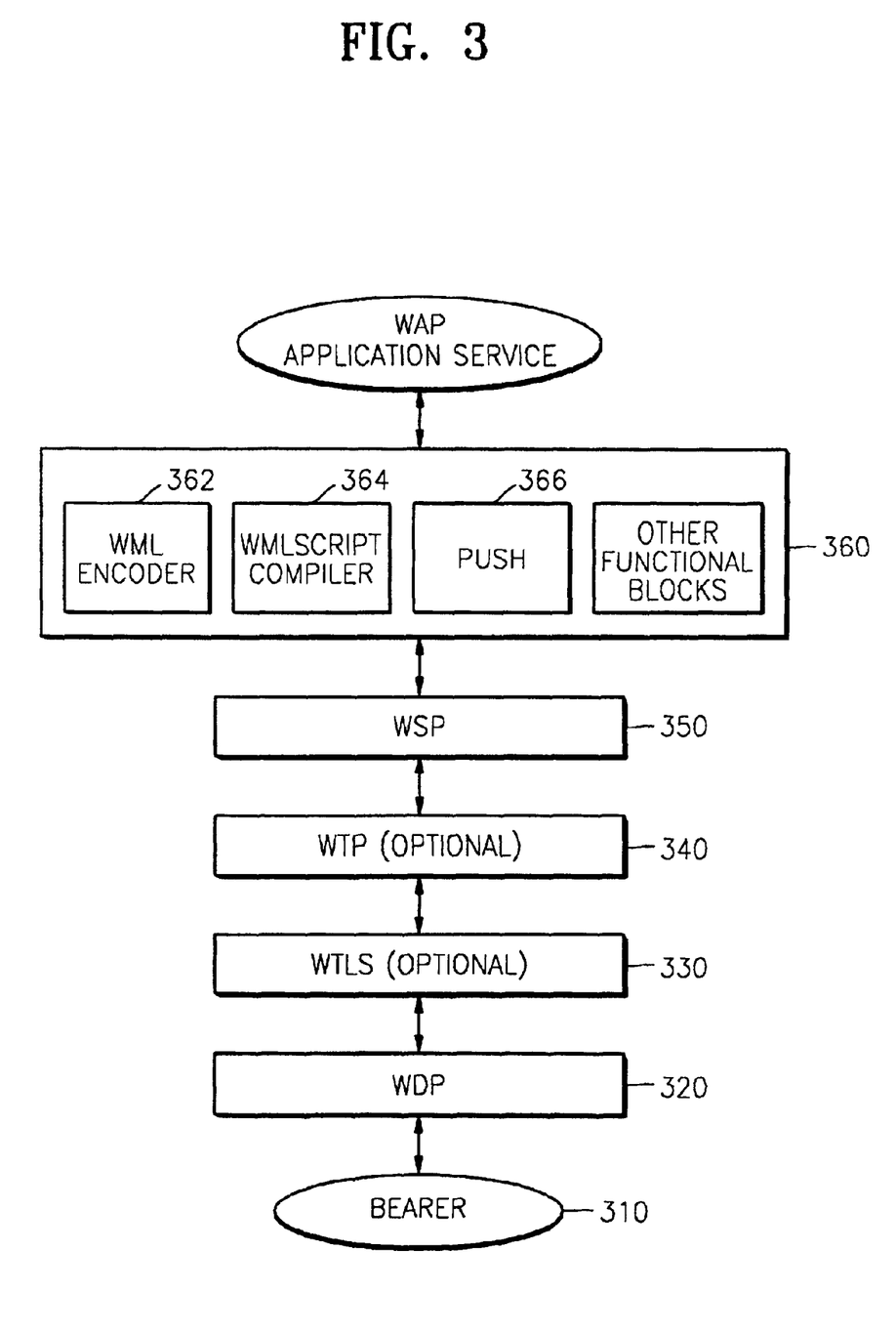
FIG. 3 is a schematic diagram illustrating an example of a protocol stack in the content provider (the wireless application protocol (WAP) server) of FIG. 2A.

FIG. 3 is a schematic diagram illustrating an example of a protocol stack in the content provider (the WAP server) 230a of FIG. 2A. FIG. 3 shows that the content provider 230a on the Internet performs data processing for a wireless Internet service at the WDP and higher layers in the WAP and data processing for a WAP application service.

A lower bearer 310 (i.e., a carrier at the lower level) conceptually shows interfacing with a wireless network environment such as CDMA, GSM or IMT2000. An actual lower bearer 310 in the content server 230a on the Internet is an Internet interfacing environment, and interfacing with the wireless network environment is directly performed in the relay.

The WDP layer 320 provides a connectionless/unreliable data service over the wireless Internet, and the optional wireless transport layer security (WTLS) layer 330 provides a security service on the wireless Internet. The optional wireless transport protocol (WTP) layer 340 is a transmission layer for guaranteeing the independence of a particular type of communications network on the wireless Internet. The wireless session protocol (WSP) layer 350 provides a session service for a higher layer and operates in a fundamentally similar manner to the HTTP over the Internet.

The wireless application environment (WAE) layer 360 provides an integrated wireless application environment for the WAP application service regardless of the type of communications network or the type of lower bearer. The WAE layer 360 includes a wireless markup language (WML) encoder 362 for a display language, a WML script compiler 364 for a script language, a push module 366 and other functional blocks.

Figure 6:
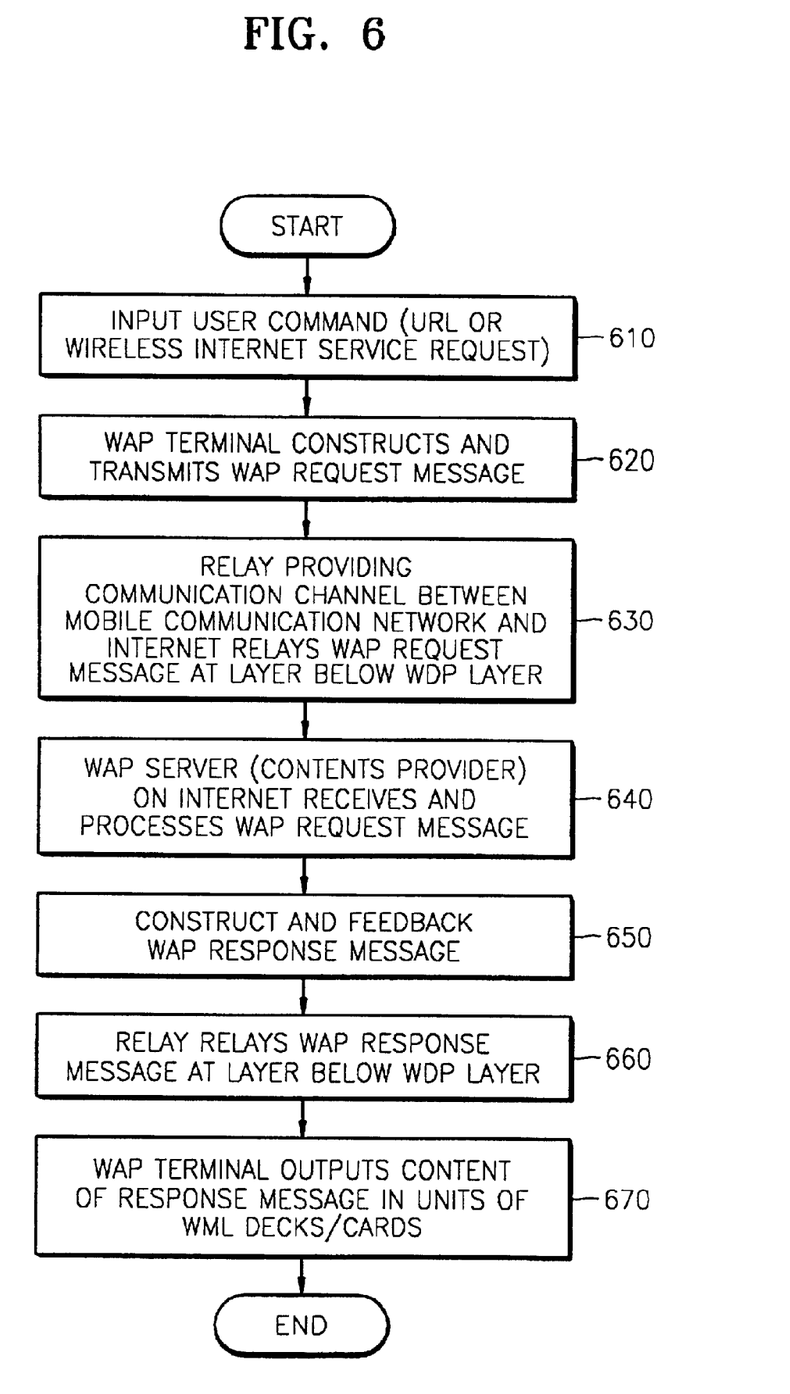
FIG. 6 is a flowchart illustrating a method for providing a WAP service through the Internet in the configuration of the system of FIG. 2A according to an embodiment of the present invention.

A detailed operation of an embodiment of the present invention will be provided with reference to FIG. 6. FIG. 6 is a flowchart illustrating a method for providing a WAP service through the Internet in the configuration of the system of FIG. 2A.

In step 610, the user of a WAP terminal requests a wireless Internet service or inputs a URL using a variety of input methods (through a keypad, voice, stylus, etc). Then, in step 620, the WAP terminal interprets user input, constructs a WAP service request message based on the WAP mode, and transmits the message to a content server (via a relay).

In step 630, the relay providing a communications channel between a mobile communications network and the Internet relays at a layer below a WDP layer such that it transfers the WAP service request message transmitted in the step 620 to the content server. Here, the relay usually provides a relay function using an Internet protocol (IP) layer or an IP tunneling method.

Thereafter, in step 640, the content server on the Internet receives the WAP service request message and properly processes it based on the WAP. In step 650, the content server constructs a WAP response message and transmits it to the WAP terminal (via the relay).

Then, in step 660, the relay relays the WAP response message at the layer (for example, an IP layer) below the WDP layer so that the WAP response message is transmitted to the WAP terminal.

Finally, in step 670, the WAP terminal interprets a WML deck of the WAP response message and displays a first card to the user.

Second Preferred Embodiment

Figure 2B:
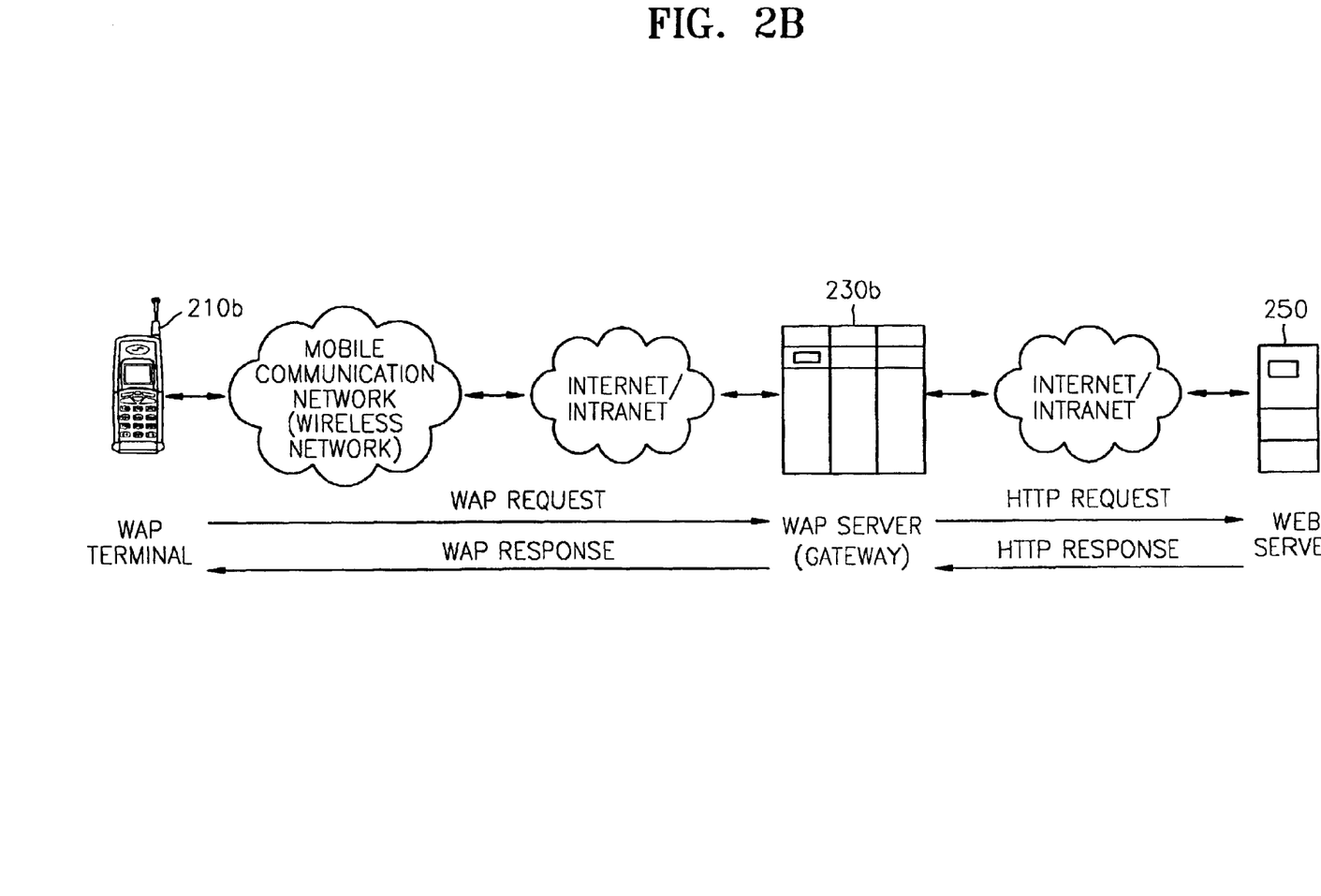

The embodiment (a first embodiment) of the present invention in which a content server on the Internet directly provides a wireless Internet service has been described. The following description concerns another embodiment (a second embodiment) in which a content server intermediates between a WAP terminal and another content provider (web server) on the Internet to provide a portal service for wireless Internet. FIG. 2B schematically illustrates an example of the configuration of a system according to the second embodiment and the operation thereof.

As shown in FIG. 2B, a WAP service model according the second embodiment includes a WAP terminal 210b which is a mobile communications terminal, a WAP server 230b for providing a portal service (for example, a gateway function) for wireless Internet, and a web server 250 for providing a content service on Internet. The WAP terminal 210b is connected to a mobile communications network, and the WAP server 230b and the web server 250 are connected to the Internet. An existing mobile communications business company just provides a communications channel between the mobile communications network and the Internet as a relay, and thus it is not shown in FIG. 2B. Here, like the first embodiment, the WAP terminal 210b is a mobile communications terminal complying with a CDMA mode, a GSM mode or an IMT2000 mode.

According to the second embodiment, the relay performs only a simple relay function of intermediating communications between the WAP terminal 210b and the WAP server 230b at a layer below a WDP layer, as in the first embodiment. Only the WAP server 230b performs data processing at the WDP layer and higher layers. Similarly to the first embodiment, the communications between the WAP terminal 210b and the WAP server 230b is accomplished based on a WAP mode.

In the second embodiment, the WAP server 230b converts a WAP service s request (received via the relay) into a web service request used in the Internet and transmits the web service request to the web server 250. When receiving a web service response from the web server 250, the WAP server 230b converts the web service response into a WAP response and transmits the WAP response to the WAP terminal 210b (via the relay). Accordingly, the communications between the WAP server 230b and the web server 250 are accomplished based on a usual HTTP mode.

Figure 4:
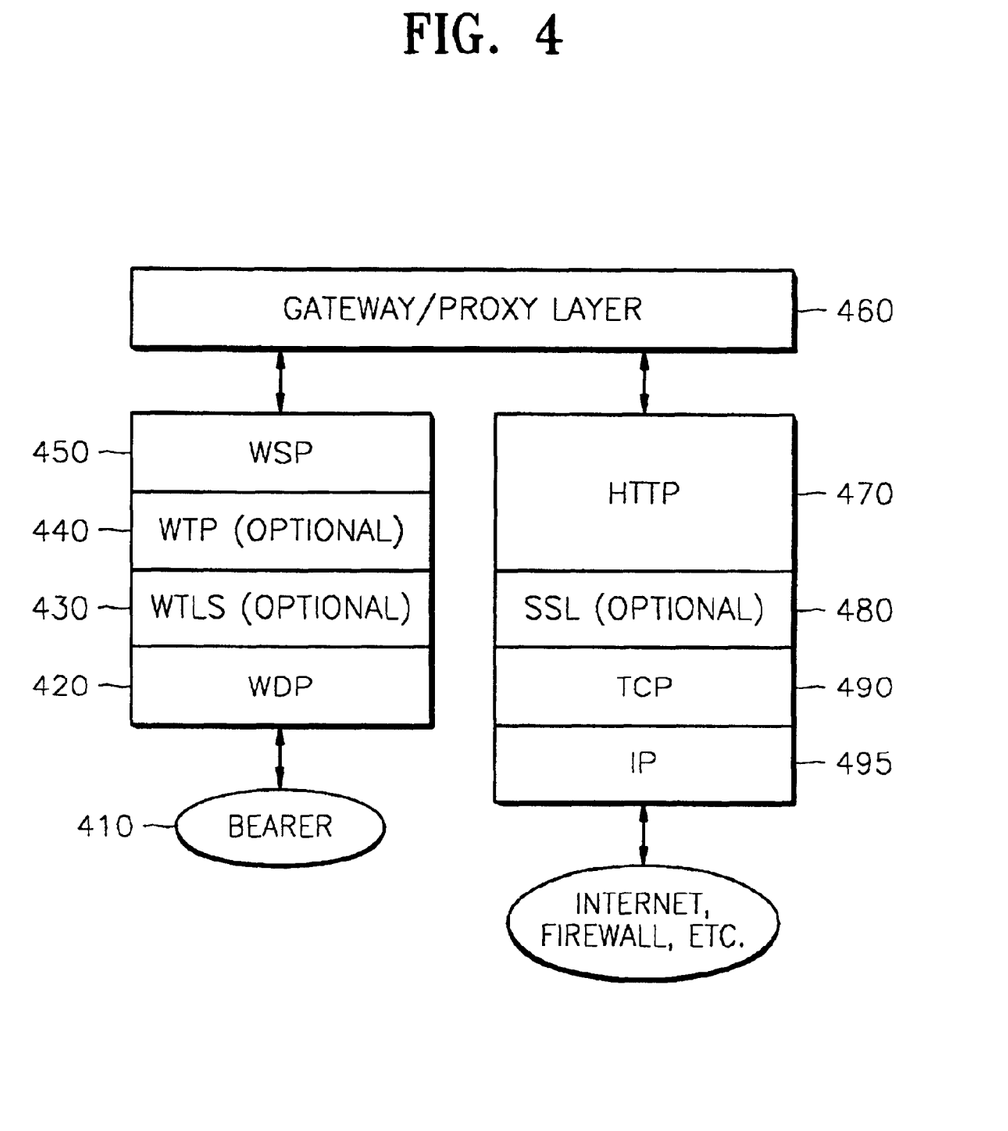
FIG. 4 is a schematic diagram illustrating an example of a protocol stack in the WAP server of FIG. 2B.

FIG. 4 is a schematic diagram illustrating an example of a protocol stack in the WAP server 230b according to the second embodiment. The protocol stack includes a portion 410 through 450 for WAP processing, a portion 470 through 495 for accessing the Internet, and a portion 460 for intermediating between the two former portions.

The portions 410 through 450 for WAP processing perform the same functions as the elements referenced by reference numerals 310 through 350 of FIG. 3 according to the first embodiment. In the portions 470 through 495 for accessing the Internet, an HTTP layer 470 and TCP and IP layers 490 and 495 are protocols fundamentally used for a web service on the Internet, and an SSL 480 provides a security service.

A gateway/proxy layer 460 performs the protocol conversion between a communications protocol (WSP) for wireless Internet and a communications protocol (HTTP) used over the Internet. The gateway/proxy layer 460 also performs the document format conversion between a document format of the content provided by a web server and a document format for a wireless Internet service. For example, the gateway/proxy layer 460 performs the document format conversion between HTML and WML and the conversion between JavaScript and WML script. When documents and other content on the Internet are constructed using WML or WML script, it is not necessary to perform document format conversion.

Figure 7:
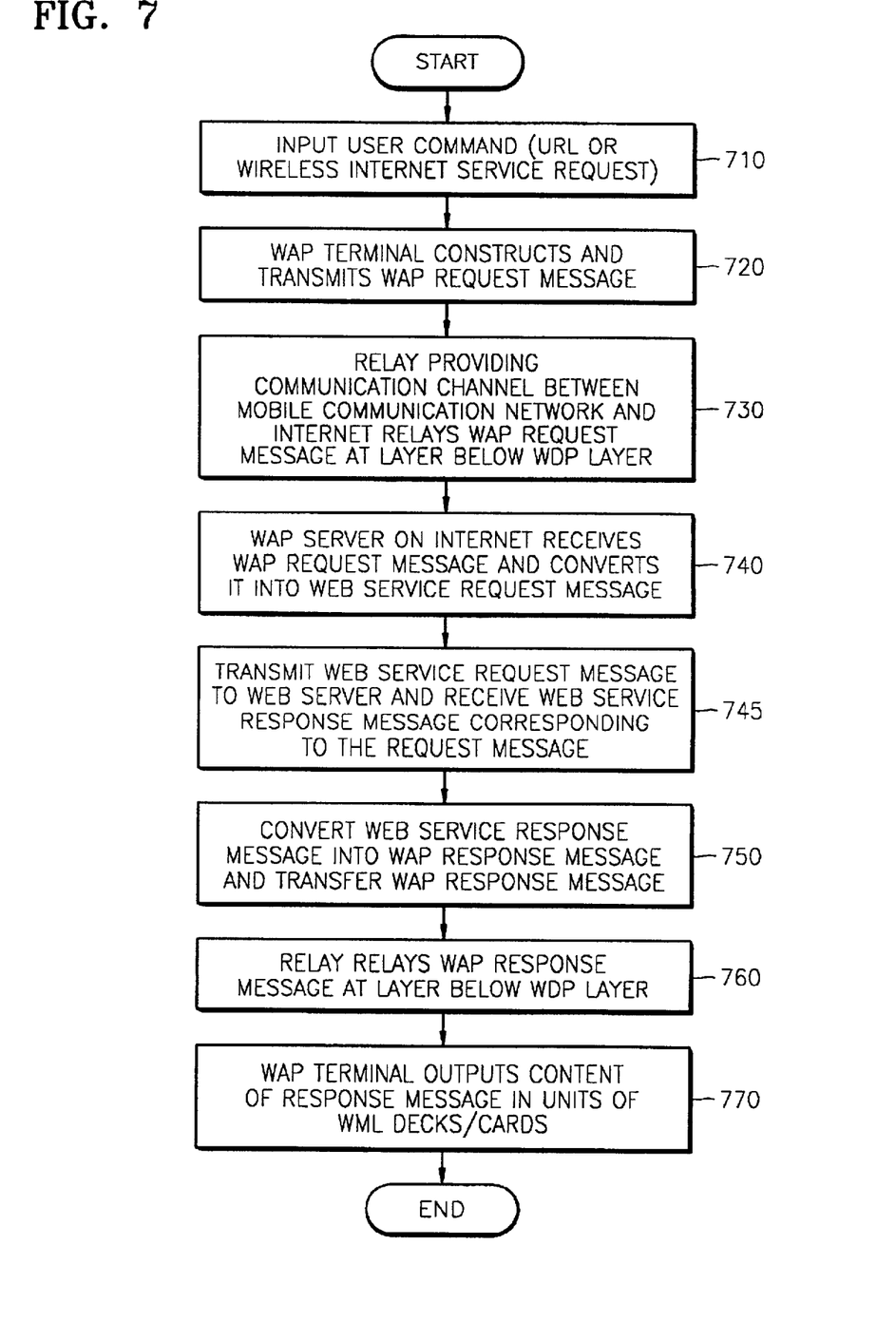
FIG. 7 is a flowchart illustrating a method for providing a WAP service (a portal service) through the Internet in the configuration of the system of FIG. 2B according to another embodiment of the present invention.

The detailed operation of the second embodiment will be described with reference to FIG. 7. FIG. 7 is a flowchart illustrating a method for providing a WAP service through the Internet according to the second embodiment.

In step 710, the user of a WAP terminal requests a wireless Internet service or inputs a URL using a variety of input methods (through a keypad, voice, stylus, etc). Then, in step 720, the WAP terminal interprets user input, constructs a WAP service request message based on the WAP mode, and transmits the message to a WAP server (via a relay).

In step 730, the relay providing a communications channel between a mobile communication network and the Internet relays at a layer below a WDP layer such that it transfers the WAP service request message transmitted in the step 720 to the WAP server. Here, as described before, the relay usually provides a relay function using an IP layer or an IP tunneling method.

Thereafter, in step 740, the WAP server on the Internet receives the WAP service request message and converts it into a web service request message used over the Internet. That is, the WAP server converts the WAP request into an HTTP request.

Next, in step 745, the WAP server transmits the web service request message to a web server on the Internet and receives a web service response message corresponding to the request message.

Then, in step 750, the WAP server converts the web service response message received in step 745 into a response message based on the WAP and transmits the WAP response message to the WAP terminal (via the relay). The HTTP response received from the web server may have an HTML, CGI or JavaScript format. Alternatively, the HTTP response may have a WML format defined by the WAP. If the HTTP response has the WML format, the WAP server only has to perform protocol conversion from HTTP to WAP. However, if the HTTP response has a format like HTML, the WAP server must perform document format conversion in addition to the protocol conversion.

Here, during the document format conversion, the principle of maintaining information, the principle of maintaining input and output, and the principle of readability must be followed. A rich data format such as an image or a table must also be properly converted. The principle of maintaining information means that information contained in an HTML page must be maintained as it is. The principle of readability means that a user must be allowed to read a corresponding WML card. The principle of maintaining input and output means that the input/output relation in an Internet site constructed using HTML must also be maintained in the result of document format conversion into WML.

Next, in step 760, the relay relays the WAP response message received in the step 750 at the layer (for example, an IP layer) below the WDP layer so that the WAP response message is transferred to the WAP terminal. In step 770, the WAP terminal interprets a WML deck of the WAP response message and displays a first card to the user.

The second embodiment for providing a portal service over the wireless Internet has been described, but it will be understood by those skilled in the art that a content server on the Internet may provide both the functions of the first and second embodiments together.

Third Preferred Embodiment

Figure 2C:
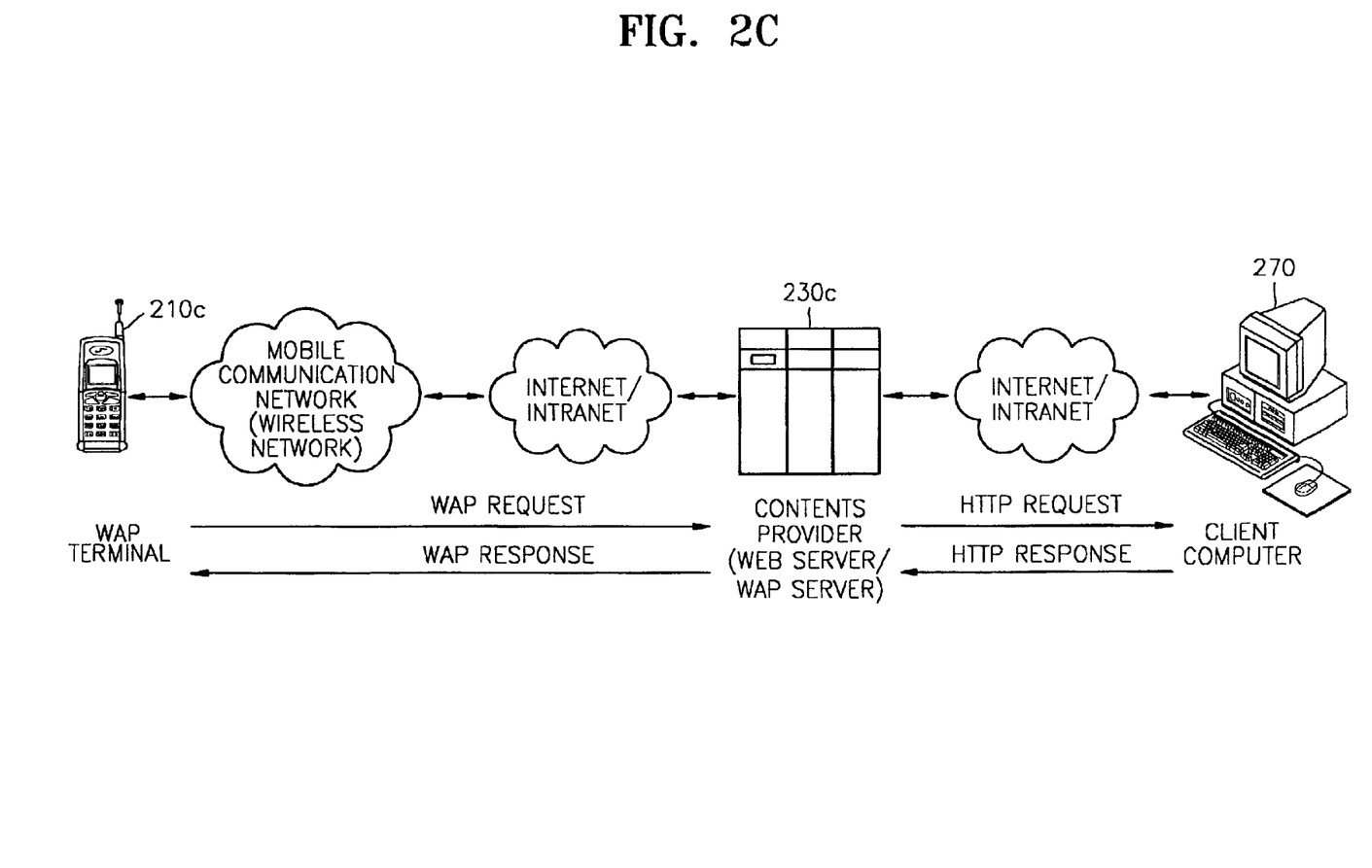

The following description concerns an embodiment (a third embodiment) in which a content server on the Internet provides a web service over the Internet and a wireless Internet service together, as the modification of the first embodiment. FIG. 2C schematically illustrates an example of the configuration of a system and the operation thereof according to the third embodiment.

As shown in FIG. 2C, a WAP service model according to the third embodiment includes a WAP terminal 210c which is a mobile communications terminal, a content server which is a web/WAP server 230c providing a web service over the Internet and a wireless Internet service together, and a client computer 270 for using a content service over the Internet.

The WAP terminal 210c is connected to a mobile communications network, and the web/WAP server 230c and the client computer 270 are connected to the Internet. An existing mobile communications business company provides just a communications channel between the mobile communications network and the Internet, as a relay, and thus it is not shown in FIG. 2C. The client computer 270 is shown to illustrate that the web/WAP server 230c provides both the web service and the WAP service together. The client computer 270 communicates with the web/WAP server 230c based on the HTTP. As mentioned before, the WAP terminal 210c is a mobile communication terminal complying with a CDMA mode, a GSM mode or an IMT2000 mode.

In the third embodiment, the relay performs only a simple relay function of relaying communications between the WAP terminal 210c and the web/WAP server 230c at a layer below a WDP layer, as in the first embodiment. The web/WAP server 230c performs data processing at the WDP layer and higher layers. In other words, the communications between the WAP terminal 210c and the web/WAP server 230c in the third embodiment is accomplished based on the WAP.

The web/WAP server 230c provides, as well as the web service through the Internet, a function of converting a document format (for example, HTML) for the web service over the Internet into a document format (for example, WML) for the wireless Internet service, so as to provide a response corresponding to a WAP service request (received via the relay).

Figure 5:
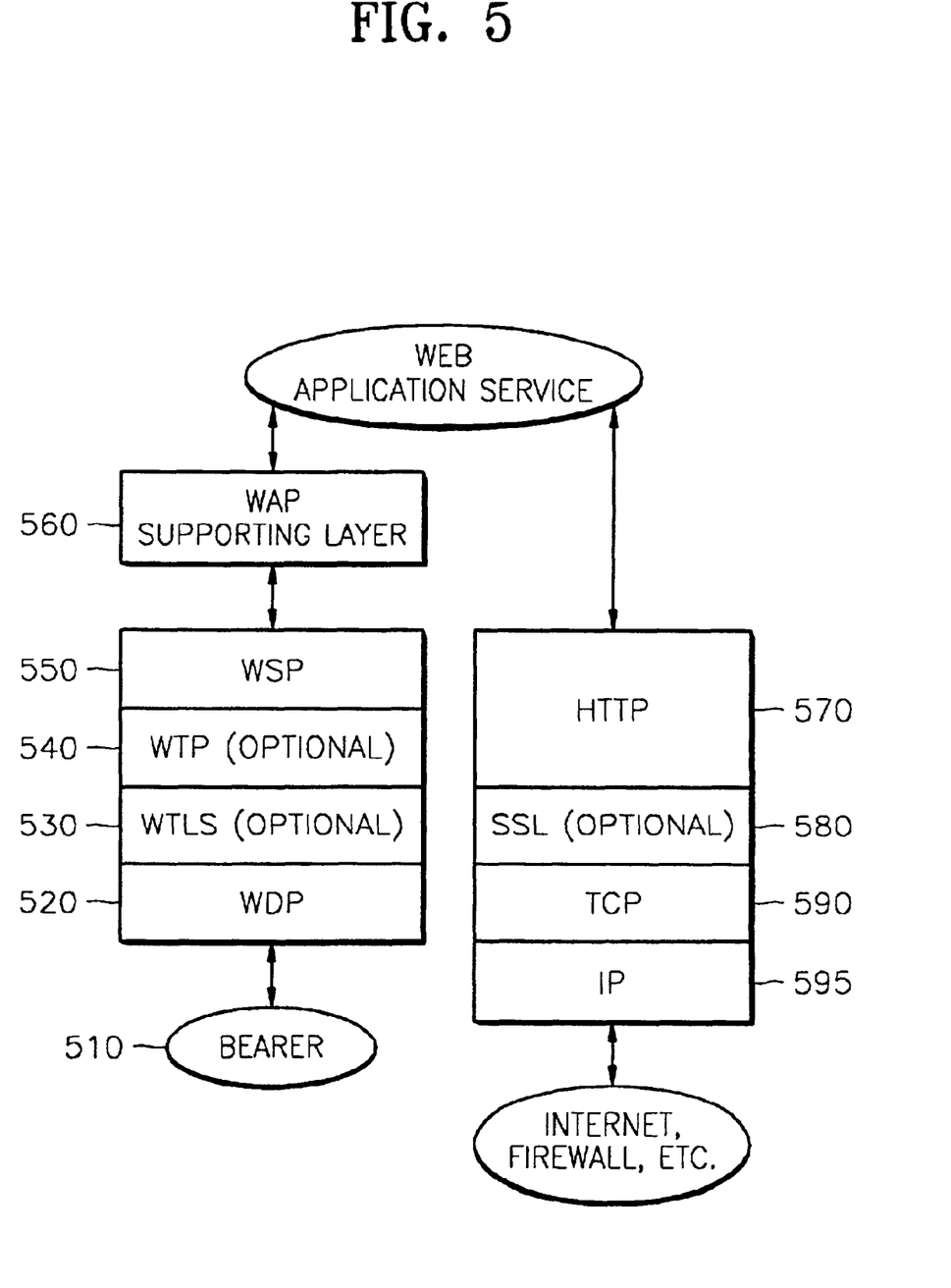
FIG. 5 is a schematic diagram illustrating an example of a protocol stack in the web/WAP server of FIG. 2C.

FIG. 5 schematically illustrates an example of a protocol stack in the web/WAP server 230c according to the third embodiment. The protocol stack is composed of portions 510 through 560 for a WAP service and portions 570 through 595 for a web service. The portions 510 through 560 for the WAP service are preferably provided using a software module (a plugin type) separately installed from a software module related to a web application service and portions 570 through 595 for the web service.

The portions 510 through 550 (excepting a WAP supporting layer 560) for the WAP service perform the same functions as the portions 310 through 350 of FIG. 3 according to the first embodiment. In the portions 570 through 595 for the web service, an HTTP layer 570 and TCP and IP layers 590 and 595 form a protocol structure fundamentally used for the web service on the Internet, and an SSL 580 provides a security service.

The WAP supporting layer 560 performs a variety of functions necessary for providing the web application service through the WAP. In other words, the WAP supporting layer 560 is an adaptation layer used for providing the WAP service in a conventional web server. The basic function of the WAP supporting layer 560 is to convert the document format of content for the web service into a document format for wireless Internet service. For example, the WAP supporting layer 560 converts HTML into WML and JavaScript into WML script. Additionally, the WAP supporting layer 560 may include a variety of functions for converting a WAP service request into a web service request and converting a web service response to a WAP service response.

Figure 8:
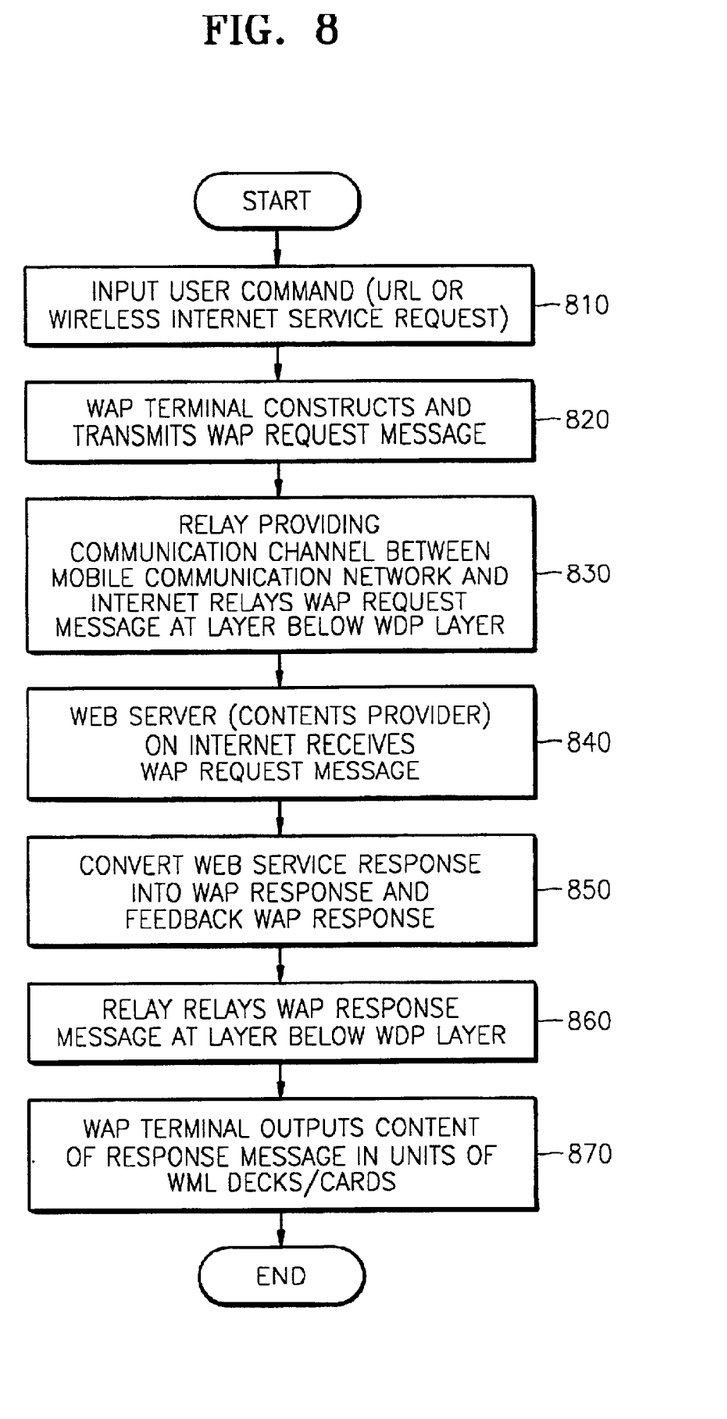
FIG. 8 is a flowchart illustrating a method for providing a WAP service through the Internet in the configuration of the system of FIG. 2C according to yet another embodiment of the present invention.

The detailed operation of an embodiment of the present invention will be provided with reference to FIG. 8. FIG. 8 is a flowchart illustrating a method for providing a WAP service through the Internet in the configuration of the system according to the third embodiment.

In step 810, the user of a WAP terminal requests a wireless Internet service or inputs a URL using a variety of input methods (through a keypad, voice, stylus, etc). Then, in step 820, the WAP terminal interprets user data, constructs a WAP service request message based on the WAP mode, and transmits the message to a content server (via a relay).

In step 830, the relay providing a communications channel between a mobile communications network and the Internet relays at a layer below a WDP layer such that it transfers the WAP service request message transmitted in the step 820 to the content server. In step 840, the content server on the Internet receives the WAP service request message transmitted in the step 830. Here, as mentioned before, the relay usually provides a relay function using an IP layer or an IP tunneling method.

In step 850, the content server on the Internet converts a document format for the web service through the Internet into a document format for the wireless Internet service, so as to provide a WAP service response corresponding to the WAP service request message received in the step 840, constructs a response message based on the WAP, and transmits the WAP response message to the WAP terminal (via the relay). As mentioned before, during document format conversion, the principle of maintaining information, the principle of maintaining input and output, and the principle of readability must be followed.

Next, in step 860, the relay relays the WAP response message received in the step 850 at the layer (for example, an IP layer) below the WDP layer so that the WAP response message is transmitted to the WAP terminal. Similarly to the first embodiment, in step 870, the WAP terminal interprets a WML deck of the WAP response message and displays a first card to the user.

The third embodiment in which a content server on Internet provides a web service through the Internet and a wireless Internet service together has been described, but it will be understood by those skilled in the art that the third embodiment can be implemented together with the first and/or second embodiments.

Generalization of the Examples

The present invention described using the examples above can be widely applied. The present invention can be largely applied to applications for providing existing Internet services for wireless terminals. In other words, the present invention will cover all kinds of business models for allowing a WAP phone, whose generalization is anticipated afterwards, to directly send a WML format request to a WAP server on the Internet without passing through the gateway of a mobile business company.

According to the present invention, the relay of a mobile communications business company providing a communications channel between a mobile communications network and the Internet performs only a relay function at a layer below a WDP layer in the WAP, and an actual content provider or a WAP server on the Internet performs data processing at the WDP layer and the higher layers in order to provide a WAP service for a wireless Internet service. Therefore, an open solution for authentic wireless Internet can be realized.

Since a WAP service user can use all-round content service regardless of the particular mobile communications business company with which the user registers, an authentic and integrated wire/wireless Internet community can be realized. In other words, a user can use every service provided over the existing Internet through the user's WAP terminal.

Since a content provider can easily develop, maintain and repair the contents it provides, a large number of users can be attracted and secured. In addition, a mobile communications business company can profit from an increase in traffic due to the prosperity of wireless Internet and this can translate into reduced costs for employing, repairing and managing a gateway for WAP solution.

Although the invention has been described with reference to particular embodiments, it will be apparent to one of ordinary skill in the art that modifications of the described embodiments may be made without departing from the spirit and scope of the invention. Accordingly, the disclosed embodiments should be considered in a descriptive sense, and not in a restrictive sense. The scope of the present invention will be defined by the appended claims, and differences within the scope should be construed to be included in the present invention.

What is claimed is:

1. A method for providing a wireless application protocol service for wireless Internet, in which a content server on the Internet performs data processing at a wireless datagram protocol layer, the method comprising the steps of:

(a) at the content server, receiving a user request message for a wireless Internet service from a wireless application protocol terminal connected to a mobile communications network, the request message being based on a wireless application protocol;

(b) at the content server, processing the request message received in the step (a) according to the wireless application protocol;

(c) at the content server, constructing a response message in accordance with the wireless application protocol, to reply to the user request message; and (d) sending the response message, from the content server, to the wireless application protocol terminal;

wherein a relay, providing a communications channel between the mobile communications network and the Internet, relays the request message transmitted in the step (a) and the response message transmitted in the step (d) at a layer always below the wireless datagram protocol layer, the request message being transferred to the content server, and the response message being transferred to the wireless application protocol terminal.

2. The method of claim 1, wherein the relay intermediates between the content server and the wireless application protocol terminal, at an Internet protocol layer lower than the wireless datagram protocol layer.

3. The method of claim 1, wherein the wireless application protocol terminal is a mobile communications terminal complying with one of a code division multiple access (CDMA) mode, a global system for mobile communication (GSM) mode, and an IMT2000 mode.

4. The method of claim 1, wherein the content server provides a push service of transmitting information to the user one-way based on the wireless application protocol.

5. A method for providing a wireless application protocol service for wireless Internet, in which a relay providing a communications channel between a mobile communications network and the Internet performs data processing at a layer only below a wireless datagram protocol layer during communications between a wireless application protocol terminal connected to the mobile communications network and a content server on the Internet, and the content server on Internet performs data processing at the wireless datagram protocol layer, the method comprising the steps of:

(a) at the wireless application protocol terminal, transmitting a request message for a wireless Internet service in accordance with a wireless communications protocol, in response to a user input;

(b) at the relay, relaying the request message transmitted in the step (a) to the content server, the relay performing data processing of the request message at a layer only below the wireless datagram protocol layer;

(c) at the content server, receiving the request message transferred in the step (b) and processing the request message in accordance with the wireless application protocol, the processing of the request message including processing at the wireless datagram protocol layer;

(d) at the content server, constructing a response message in accordance with the wireless application protocol, in reply to the request message, and transmitting the response message;

(e) at the relay, relaying the response message transmitted in the step (d) at the layer only below the wireless datagram protocol layer so at to transfer the response message to the wireless application protocol terminal; and (f) at the wireless application protocol terminal, outputting the contents of the response message transferred in the step (e).

6. A method for providing a wireless application protocol service for wireless Internet, in which a wireless application protocol server on the Internet performs data processing at a wireless datagram protocol layer, the method comprising the steps of:
(a) at the wireless application protocol server, receiving a user request message for a wireless Internet service from a wireless application protocol terminal connected to a mobile communications network, the request message being based on a wireless application protocol;
(b) converting the request message received in the step (a) into a web service request message used over the Internet;
(c) transmitting the web service request message to a web server on the Internet and receiving a web service response message corresponding to the request message;
(d) converting the web service response message received in the step (c) into a response message based on the wireless application protocol; and
(e) transmitting the response message based on the wireless application protocol to the wireless application protocol terminal,
wherein a relay providing a communication channel between the mobile communication network and the Internet relays the request message transmitted in the step (a) and the response message transmitted in the step (e), said relaying being performed with data processing of said messages at a layer only below the wireless datagram protocol layer, the request message being transferred to the wireless application protocol server, and the response message being transferred to the wireless application protocol terminal.

7. The method of claim 6, wherein in the steps (b) and (d), protocol conversion is performed between a communications protocol for the wireless Internet service and a communications protocol for a web service through the Internet.

8. The method of claim 6, wherein in the step (d), protocol conversion is performed between a communications protocol for the wireless Internet service and a communications protocol for a web service through the Internet, and wherein document format conversion is performed between a document format for the wireless Internet service and a document format for a web service through the Internet.

9. The method of claim 6, wherein the relay intermediates between the wireless application protocol server and the wireless application protocol terminal, at an Internet protocol layer below the wireless datagram protocol layer.

10. The method of claim 6, wherein the wireless application protocol terminal is a mobile communications terminal complying with one of a code division multiple access (CDMA) mode, a global system for mobile communication (GSM) mode, and an IMT2000 mode.

11. A method for providing a wireless application protocol service for wireless Internet, in which a relay, providing a communications channel between a mobile communications network and the Internet, performs data processing at a layer only below a wireless datagram protocol layer during communications between a wireless application protocol terminal connected to the mobile communications network and a wireless application protocol server on the Internet, the wireless application protocol server on the Internet performing data processing at the wireless datagram protocol layer, said method comprising:
(a) at the wireless application protocol terminal, transmitting a request message for a wireless Internet service according to a wireless communications protocol, in response to an input by a user;
(b) at the relay, relaying the request message transmitted in the step (a) at the layer below the wireless datagram protocol layer so that the request message is transferred to the wireless application protocol server;
(c) at the wireless application protocol server, receiving and converting the request message transferred in the step (b) into a web service request message according to a protocol used over the Internet;
(d) transmitting the web service request message to a web server on the Internet and receiving a web service response message corresponding to the request message;
(e) at the wireless application protocol server, converting the web service response message received in the step (d) into a response message based on the wireless application protocol and transmitting it to the wireless application protocol terminal;
(f) at the relay, relaying the response message transmitted in the step (e) at the layer below the wireless datagram protocol layer to transfer the response message to the wireless application protocol terminal; and
(g) at the wireless application protocol terminal, outputting the contents of the response message transmitted in the step (f).

12. A method for providing a wireless application protocol service for wireless Internet, in which a content server providing a web service on the Internet performs data processing at a wireless datagram protocol layer, the method comprising the steps of:
(a) at the content server, receiving a user request message for a wireless Internet service from a wireless application protocol terminal connected to a mobile communications network, the request message being based on a wireless application protocol;
(b) at the content server, converting a document format for the web service through the Internet into a document format for the wireless Internet service in order to provide a response to the user request message;
(c) constructing a response message based on the wireless application protocol, using the response, converted into the document format for the wireless Internet service in the step (b); and
(d) transmitting the converted response to the wireless application protocol terminal;
wherein a relay providing a communications channel between the mobile communications network and the Internet relays the request message transmitted in the step (a) and the response message transmitted in the step (d) at a layer only below the wireless datagram protocol layer such that the request message is transferred to the content server, and the response message is transferred to the wireless application protocol terminal.

13. The method of claim 12, wherein the relay intermediates between the content server and the wireless application protocol terminal, at an Internet protocol layer.

14. The method of claim 12, wherein the wireless application protocol terminal is a mobile communications terminal complying with one of a code division multiple access (CDMA) mode, a global system for mobile communication (GSM) mode, and an IMT2000 mode.

15. The method of claim 12, wherein the wireless application protocol service provided by the content server together with the web service through the Internet is supported by a software module installed separately from a software module for the web service.

16. A method for providing a wireless application protocol service for wireless Internet, in which a relay providing a communications channel between a mobile communications network and the Internet only performs data processing at a layer only below a wireless datagram protocol layer during communications between a wireless application protocol terminal connected to the mobile communications network and a content server providing a web service through the Internet, and the content server on the Internet performs data processing at the wireless datagram protocol layer, the method comprising the steps of:

(a) at the wireless application protocol terminal, constructing and transmitting a request message for a wireless Internet service based on a wireless communications protocol, in response to an input by a user;

(b) at the relay, relaying the request message transmitted in the step (a) at the layer only below the wireless datagram protocol layer so that the request message is transferred to the content server;

(c) at the content server, receiving the request message transferred in the step (b);

(d) at the content server, converting a document format for the web service through the Internet into a document format for the wireless Internet service in order to provide a response to the user request message;

(e) constructing a response message based on the wireless application protocol, using the response converted into the document format for the wireless Internet service in the step (d), and transmitting the constructed response message;

(f) at the relay, relaying the response message transmitted in the step (e) at the layer only below the wireless datagram protocol layer so that the response message is transferred to the wireless application protocol terminal; and (g) at the wireless application protocol terminal, outputting the contents of the response message transmitted in the step (f).

17. A system for providing a wireless application protocol service, the system comprising:

a service terminal supporting a wireless application protocol, and connected to a mobile communications network;

a relay providing a communications channel between the mobile communications network and the Internet; and a content server for providing a content service for wireless Internet, the content server being connected to the Internet, wherein the relay intermediates between the service terminal and the content server only at one or more layers below a wireless datagram protocol layer, and the content server performs data processing including the wireless datagram protocol layer, thereby providing the wireless application protocol service for the service terminal.

18. A system for providing a wireless application protocol service, the system comprising:

a service terminal supporting a wireless application protocol and connected to a mobile communications network;

a relay providing a communications channel between the mobile communications network and the Internet;

a content server providing content through a web service over the Internet, the content server being connected to the Internet; and a wireless application protocol server intermediating between the service terminal and the content server, the wireless application protocol server being connected to the Internet, wherein:
the relay intermediates between the service terminal and the wireless application protocol server only at one or more layers below a wireless datagram protocol layer,
the wireless application protocol server performs data processing including the wireless datagram protocol layer or higher layers,
the wireless application protocol server converts a service request into a web service request used over the Internet and transmits the service request to the content server when receiving the service request based on a wireless application protocol from the service terminal via the relay, and
the wireless application protocol server converts a web service response into a response based on the wireless application protocol, and transmits the converted response to the service terminal via the relay when receiving the web service response from the content server.

19. A system for providing a wireless application protocol service, the system comprising:

a service terminal supporting a wireless application protocol and connected to a mobile communications network;

a relay providing a communications channel between the mobile communications network and the Internet; and a content server providing content through a web service over the Internet and providing a content service for wireless Internet, the content server being connected to the Internet, wherein:
the relay intermediates between the service terminal and the content server at a layer only below a wireless datagram protocol layer,
the content server performs data processing at the wireless datagram protocol layer or higher layers, and
the content server has a function of converting a document format for the web service into a document format for a wireless Internet service in order to provide the wireless application protocol service for the wireless Internet to the service terminal.

* * * * *